No. 737,981. PATENTED SEPT. 1, 1903.
J. WEICHHART.
BELT SHIFTING DEVICE.
APPLICATION FILED JAN. 28, 1903.
NO MODEL.
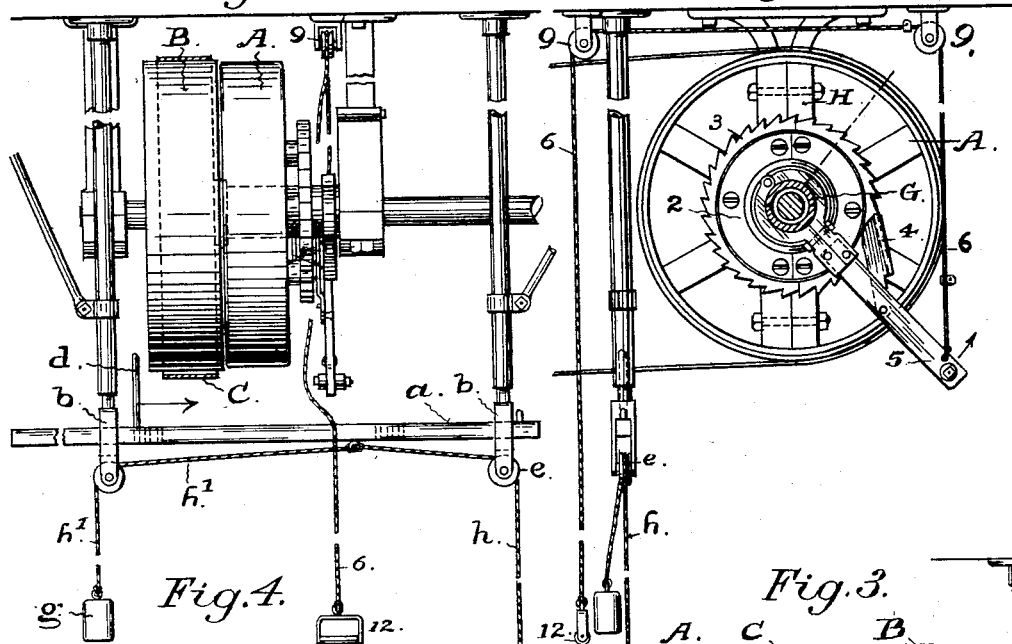
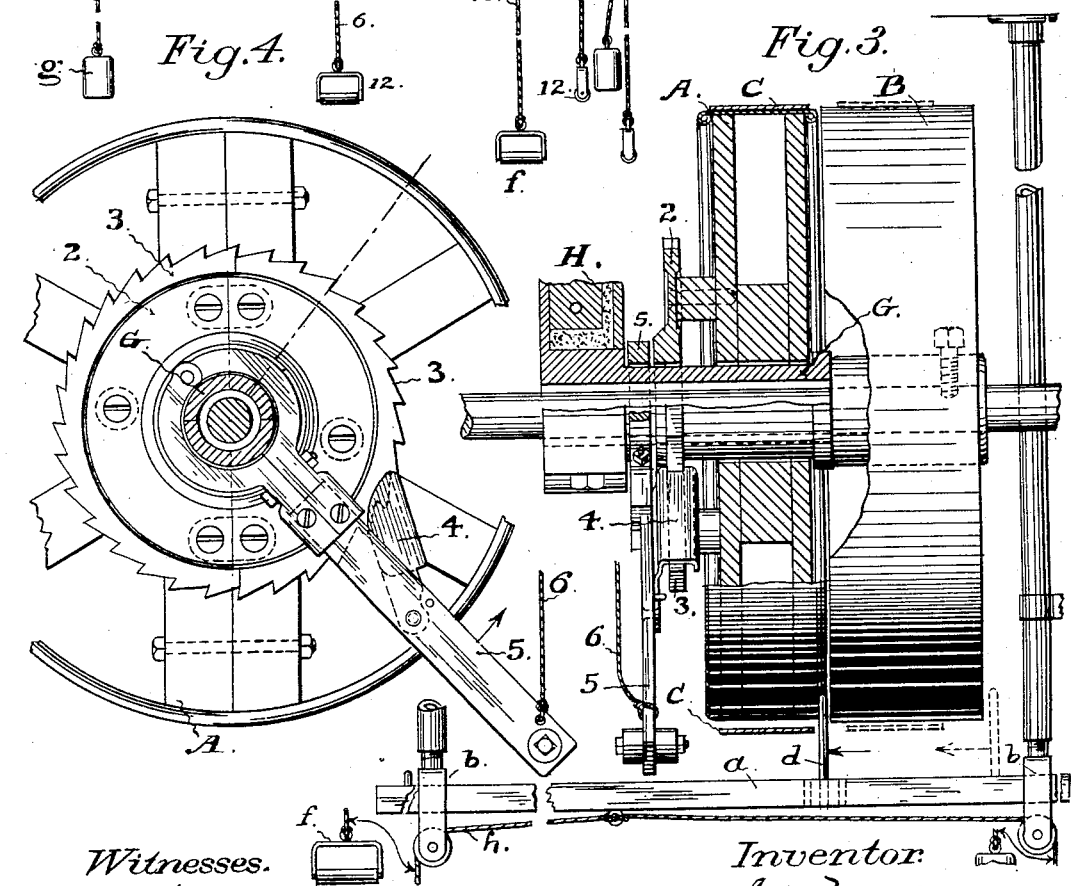

No. 737,981. Patented September 1, 1903.

UNITED STATES PATENT OFFICE.

JOHN WEICHHART, OF SAN FRANCISCO, CALIFORNIA.

BELT-SHIFTING DEVICE.

SPECIFICATION forming part of Letters Patent No. 737,981, dated September 1, 1903.

Application filed January 28, 1903. Serial No. 140,889. (No model.)

*To all whom it may concern:*

Be it known that I, JOHN WEICHHART, a citizen of the United States, residing in the city and county of San Francisco and State of California, have invented new and useful Improvements in Belt-Shifting Devices, of which the following is a specification.

This invention relates to a device for shifting a belt from a live pulley to a dead pulley or belt-carrier of the character or description for which Letters Patent of the United States were granted and issued to me on the 15th day of July, 1902, No. 704,723.

The invention comprises a novel construction and combination of belt-carrier and means for rotating the belt-carrier at will from a given station adjacent to the machine or convenient to the workman, the means for rotating the belt-carrier being arranged to turn it in the same direction as the fast pulley is running, whereby the belt is transferred from the belt-carrier to the fast pulley by turning the belt-carrier.

The following description explains at length the nature of the said invention and the manner in which I proceed to construct, apply, and carry out the same, reference being had to the drawings that accompany and form part of this specification.

Figure 1 represents in front elevation my improved belt-shifting means applied to and combined with a loose pulley and a fast pulley on a line-shaft from which a belt is carried to the pulleys on a machine below. Fig. 2 is an elevation taken from the right side of Fig. 1. Fig. 3 is a rear elevation of Fig. 1 on an enlarged scale. Fig. 4 is a side view of the loose pulley, showing in detail the device to turn the pulley on the shaft.

The novel features of the mechanism illustrated in the drawings consist of a ratchet-wheel fast on the belt-carrier and a pawl carried by an arm or lever that is movable in an arc having the shaft for its center of movement and is connected by a cord of indefinite length with a hand-grip situated convenient to the workman. By oscillating or moving the lever up and down the pawl and ratchet-wheel cause the belt-carrier to turn, and by this movement, rotating it in the same direction as the fast pulley, with which it is arranged to run in close relation, the belt-carrier is caused to shift the belt laterally and transfer it to the fast pulley or driver. A separate shifting device for throwing off the belt from the live pulley or driver is also provided for giving the workman complete control of the belt from a station at a distance from the pulley. This last-mentioned belt-shifting means may be of any well-known construction, and the same is described and shown herein with my improved shifting device on the belt-carrier merely for the purpose of representing and describing a complete means or apparatus for transferring a belt in both directions to throw the power off or on.

In the drawings, *a* represents a belt-shifter of ordinary character, consisting of a slide-bar carried in slotted guides *b* and having an arm *d* to engage the belt C on the side of the fast pulley B farthest from the belt-carrier.

A hand-rope *h*, attached to the slide-bar, is carried by sheaves *e* to the point or station from which the shifter is to be operated, and at that end the rope is provided with a hand-grip *f*. A counterweight *g*, attached to the slide-bar by a rope *h'*, returns the shifter to position clear of the belt when the hand-rope is released.

The support and bearing for the belt-carrier A is a stationary sleeve G, surrounding the shaft, with a bore somewhat larger diametrically than the shaft, so that the latter runs clear of it, and this sleeve is a part of a hanger H, in which the belt-carrier is supported in close relation to the fast pulley, but clear of the shaft. Hangers of similar construction having a sleeve for supporting a belt-carrier clear of the shaft and in close relation to the fast pulley are in use at the present time, and that feature of itself is not a novel part of my present improvement. A support of this character is shown and described in my Letters Patent, already referred to in this description.

Fast on the side of the belt-carrier A a disk 2, with a ratchet-toothed rim 3, concentric with that pulley, engages a pivoted dog or pawl 4, carried by an arm or lever 5, so mounted or hung from the sleeve or support that by moving the outer end of the arm in one direction the pawl will engage the ratchet-teeth and in the other direction the pawl will slip on the rim. From the end of the arm a cord 6 is carried over guide-sheaves 9 to the station from which the belt-shifter is to be operated and where a handle 12 is provided on the end of the rope. Through the medium of this rope the outer end of the arm is moved in one direction, giving motion to the belt-carrier, and as the rope is slackened the arm drops back to position by its own weight to take a fresh grip on the ratchet. A few of such rotative movements following one another in rapid succession cause the belt to move laterally from the belt-carrier and onto the continuously-traveling pulley alongside of it, because the tendency of a belt when in motion is to adjust itself to the most direct and shortest line between the driver and the driven pulley, and as the belt is set out of such direct working line whenever it is shifted from the driver onto the carrier or dead-pulley the rotative movement given to the latter by the oscillating arm causes the belt to run off the carrier and onto the live-pulley. A belt of large size and weight can be controlled by this mechanism and readily shifted from the belt-carrier to the driver.

It should be mentioned that this shifting device is specially adapted for transferring a belt to a live pulley from a dead pulley or belt-carrier, such as I have included in my former Letters Patent.

Having thus fully described my invention, what I claim as new therein, and desire to secure by Letters Patent, is—

1. The combination with a fast pulley, of a belt-carrier mounted in close relation to it to take a belt therefrom, and means for rotating the belt-carrier at will in the same direction as the fast pulley is traveling, to shift the belt from the belt-carrier to the fast pulley, comprising an oscillating arm, means operating to lock the arm to the belt-carrier in one direction of its oscillation and to disconnect the arm and the belt-carrier in the other direction.

2. The combination of a belt, a fast pulley, a belt-carrier mounted in close relation to the fast pulley to take the belt therefrom, and means for rotating the belt-carrier at will with the same direction of motion as the fast pulley, comprising an oscillating arm, means operated by said arm to lock it to the belt-carrier in one direction of its oscillation and to release the belt-carrier in the other direction of its oscillation, and means connected to said arm for operating it from a station distant from the belt-carrier.

3. The combination with a fast pulley and a belt-carrier arranged in operative relation to each other, of means for rotating the belt-carrier at will in the same direction as the fast pulley is traveling, comprising an oscillating arm, a pawl carried thereby and a circle of ratchet-teeth on the belt-carrier with which the pawl is adapted to engage, and means connected to the arm for oscillating it from a station distant from the belt-carrier.

4. The combination with a belt, a fast pulley, or driver, and a belt-carrier, of belt-shifting devices comprising a belt-shifting means operating to move the belt laterally and transfer it from the fast pulley to the belt-carrier and means for shifting the belt from the belt-carrier to the fast pulley, consisting of an oscillating arm, a pawl carried thereby, a circle of ratchet-teeth on the belt-carrier with which the pawl is adapted to engage and a cord connected to the oscillating arm as a means of actuating said arm.

In testimony whereof I have signed my name in the presence of two subscribing witnesses.

JOHN WEICHHART.

Witnesses:
  EDWARD E. OSBORN,
  M. REGNER.